United States Patent [19]

Beaman et al.

[11] 4,383,444
[45] May 17, 1983

[54] MICROPROCESSOR BASED CAPACITANCE LEVEL DETECTION SYSTEM

[75] Inventors: Norman V. Beaman, Orange; Gary B. Sellers, Placentia, both of Calif.

[73] Assignee: Robertshaw Controls Company, Richmond, Va.

[21] Appl. No.: 141,908

[22] Filed: Apr. 21, 1980

[51] Int. Cl.³ .............................................. G01F 23/26
[52] U.S. Cl. .................................... 73/304 C; 73/1 H
[58] Field of Search ............ 73/304 C, 1 H; 361/284; 340/59, 870.39, 620

[56] References Cited

U.S. PATENT DOCUMENTS

4,058,765 11/1977 Richardson et al. ............. 73/304 C
4,208,909 6/1980 Maltby et al. .................... 73/304 C
4,232,300 11/1980 Wright et al. .................... 73/304 C

Primary Examiner—Donald O. Woodiel
Attorney, Agent, or Firm—Fulwider, Patton, Rieber, Lee & Utecht

[57] ABSTRACT

An improved level measuring system based upon capacitance to current conversion is provided with equipment for compensating for variations in dielectric constant in a measured liquid. A reference probe is located entirely within the liquid to be measured, but is sensitive to changes in dielectric constant. The measurement probe responds both to changes in dielectric constant and variations in liquid level. A differential output from the reference probe and the measurement probe effectuates compensation for variations in the dielectric constant in the material measured. A control unit at the output provides means for automatic calibration through a microprocessor.

19 Claims, 10 Drawing Figures

FIG. 8 bayonnet # MICROPROCESSOR BASED CAPACITANCE LEVEL DETECTION SYSTEM

BACKGROUND OF THE INVENTION

1. Field of the Invention

The present invention is a device for use in measuring a process variable, such as level, pressure or proximity, based upon the changes in capacitance through the material measured. Changes in capacitance in a sensor are transformed to electrical current, the magnitude of which is indicative of the magnitude of the process variable being measured. Also, the measurement and reference outputs are used in a microprocessor which compensates for variations in dielectric constant in the measured medium by preprogrammed compensation equations. Calibration is automatically performed with a manual input to the microprocessor to vary the association of particular relative levels therein in association with specific output levels. That is, selected percentages of full scale can be associated with specific output electrical current levels from the sensor.

2. Description of the Prior Art

Capacitance to current transmitters have been used for many years for the detection of changes in process variables such as pressure of gases, the level of liquids and solids or the proximity of a body. Usually the transmitters employ a probe in the form of a rigid, rod-shaped electrode. The capacitance between the probe and a grounded terminal varies in response to the environment surrounding the probe. That is, for example, the capacitance changes as the liquid level rises in a vessel, since the liquid immerses an increasing length of the electrode probe.

Some of the prior capacitance transmitter circuits have included the variable capacitance of a sensor in an oscillating circuit, whereby the output frequency is a function of the variable sensor capacitance. U.S. Pat. Nos. 3,518,537 and 3,896,374 describe such circuits. Other circuits have used comparators for determining the difference between the charging rates of a standard capacitor and of the variable capacitance between the probe and a ground plane electrode. U.S. Pat. Nos. 3,487,300; 3,811,051 and RE 27,829 describe such systems.

SUMMARY OF THE INVENTION

The present invention is a system for measuring a process variable in which capacitance is quantitatively proportional to the variable to be measured and in which compensation for changes in the dielectric constant of the process variable is achieved. In measuring the level of a liquid, for example, the capacitance between a measuring probe and a ground plane electrode varies proportionally with the height of the liquid along the probe and the dielectric constant of the liquid and any insulation surrounding the probe. Since it is desirable for the measurement of capacitance to vary only with height of liquid in a vessel, some form of compensation for variations in dielectric constant must be achieved.

According to the present invention, compensation for variations in dielectric constant of a process material is achieved by providing a sensing probe with two electrically isolated sections. The lower section is a reference probe and is always covered by the liquid, the height of which is to be measured by the upper section. The dielectric constant of the material can easily be computed relative to the output of the reference probe in air, which has a dielectric constant of 1. This computation is achieved by providing the output of the reference probe as an input to a microprocessor.

In addition to an input from the reference probe which is isolated from the effects of a change in the liquid height, the microprocessor is also provided with an input from a measuring probe which responds both to changes in liquid height and also to any changes in the dielectric constant. Changes in the dielectric constant are ascertained from the reference probe, and compensation is performed to the output of the measuring probe accordingly.

The preferred embodiment of the entire instrument is formed by the sensor, having the reference and measuring probes, a signal transmitter, and a control unit coupled thereto by an umbilical connection and housing a microprocessor and containing a manually adjustable selector for calibration. The microprocessor may be provided with a display unit and/or output control lines and may be located up to 1,000 feet from the sensor. The instrument can be factory calibrated for a given installation, push button calibrated, and recalibrated. Variations in dielectric constant and even a change in the material measured will not affect the accuracy of the calibration. With the push button calibration technique it is not necessary to repeatedly empty and fill or even completely fill the process container, as is required in prior capacitance actuated level detector instruments. Compensation for dielectric variations in the measured process is achieved by monitoring the process with the reference probe and calculating the true level with the microprocessor. The microprocessor output is digitally calibrated and may be provided with multiple alarm trip levels and/or with a data bus communication connection to a higher level digital system or digital computer for monitoring level or alarm conditions.

The sensor is an elongated structure which is mounted to extend into a container of a liquid. The sensor includes a bayonnet type connector at the top. Preferably the sensor includes a cylindrical, annular ground plane electrode which is perforated at intervals along its length to allow the admission and egress of liquid. The reference probe is a solid rod about 6 inches long and located concentrically within the confines of the ground plane electrode within its lowermost portion. Since the reference probe must always be covered, the lowest six inches of the process cannot be measured in the preferred embodiment, although an improvement may well be possible in which the reference probe and lower portion of the ground plane electrode are bent or constructed at right angles to the upper portion thereof. In such an embodiment, the unmeasureable height is reduced to about one inch.

In either embodiment the measurement probe is a cylindrical annular structure located concentrically within the upper portion of the ground plane electrode. The outer diameter of the measuring probe is equal to the diameter of the reference probe. The reference probe is coupled to the bayonnet connector by an electrical conductor that passes axially through the measuring probe, through the axial opening therein. Preferably the conductor is electrically shielded from the measuring probe by an annular jacket which is located concentrically within the measuring probe and about the conductor above the reference probe.

Externally of the sensor there is an electronic signal transmitter circuit which includes a multivibrator and charge rate discriminator. This circuit preferably includes a CMOS oscillator which develops a periodic pulse to trigger three single pole switches. One of these switches is connected to a standard capacitor with a fixed current generator. The other two switches are connected to adjustable fixed current generators which are controlled through a feed back loop to draw the same current as the standard capacitor. The oscillator periodically opens the normally closed switches which otherwise couple the standard capacitor, the reference probe, the measuring probe and the shielded jacket to the ground plane electrode. When the oscillator opens the switches, an electrical charging source applies a common electrical current to one side of the standard capacitor, the other side of which is connected to the ground plane electrode, and also between the ground plane electrode and the reference probe, and also between the ground plane electrode and the measuring probe. Sawtooth voltage wave forms are developed across the capacitances.

Differential amplifying circuitry is coupled to the reference probe and to the measuring probe to detect a capacitance differential therebetween. The differential amplifying circuitry preferably includes a pair of differential amplifiers, both having a first input connected to the standard capacitor. One of the differential amplifiers has a second input connected to the reference probe and the other has a second input connected to the level measuring probe. The outputs of the two differential amplifiers are both connected to the microprocessor. Both of these outputs also include feedback loops to their respective uncoupled inputs from the reference probe and from the measuring probe through a fixed current generator associated therewith. The output of the fixed current generator is adjustable to supply a selected current flow.

The invention may be described with greater clarity and particularly by reference to the accompanying drawings.

DESCRIPTION OF THE EMBODIMENT

Figure 1:
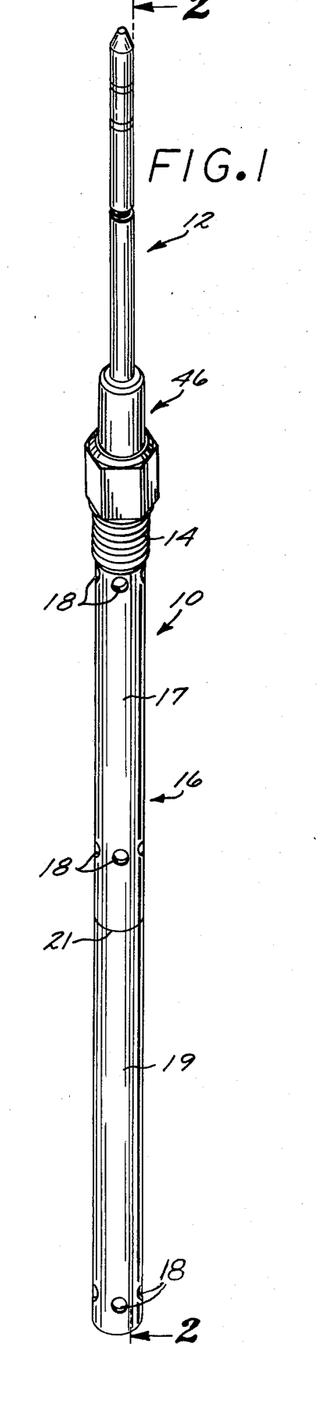
FIG. 1 is a perspective view of the sensor of the invention.
Figures 2, 3, 4:
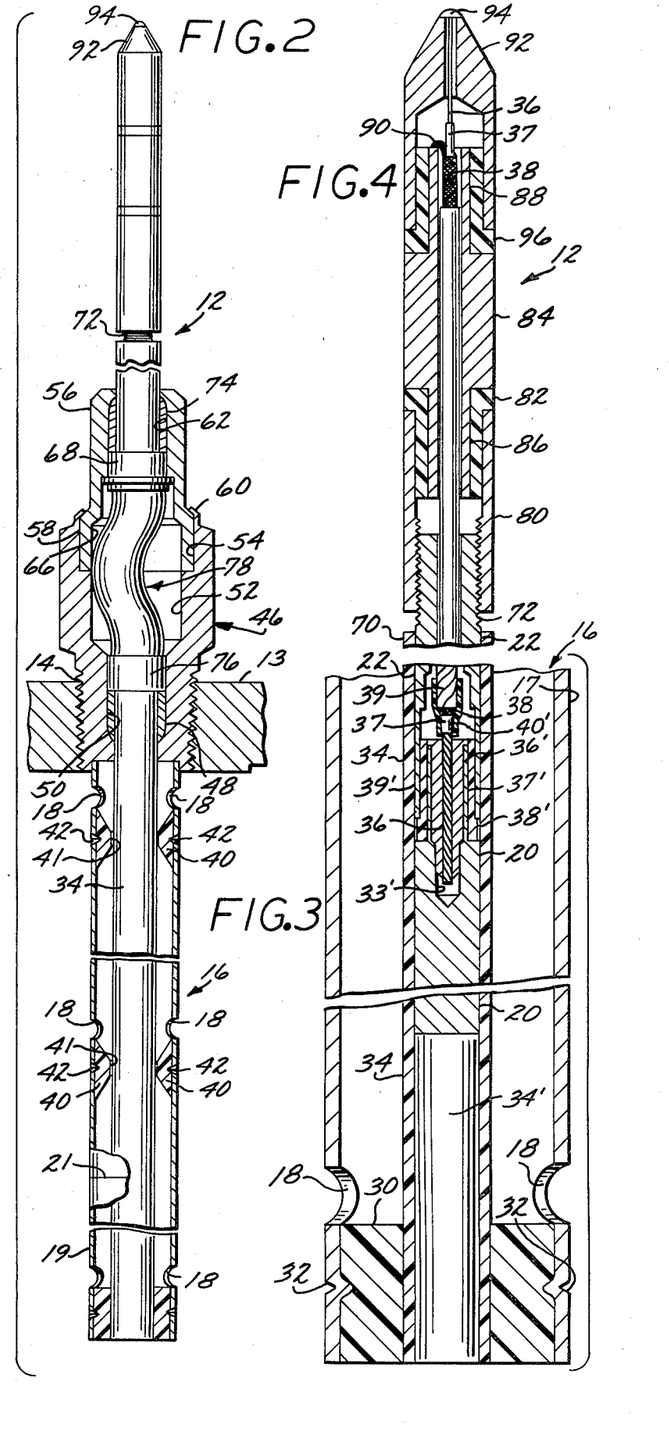
FIG. 2 is a side sectional view of the sensor of the invention broken as indicated.
FIG. 3 is an enlarged detail view illustrating the probe and electrode construction.
FIG. 4 is an enlarged detail view showing the electrical connections to the probes and the ground plane electrode.

FIG. 1 illustrates in perspective the sensor 10 for the dielectric constant compensated measuring device of the invention. The sensor 10 is of a generally elongated cylindrical construction. At the upper extremity of the sensor 10 there is a rod-like probe terminal 12 which mates with a bayonnet type fitting that leads to the signal transmitter circuitry. The sensor 10 is normally mounted in an internally threaded aperture in a flat, laterally extending deck 13 by means of an externally threaded shank 14 on a configured cylindrical gland assembly 46, as depicted in FIG. 2. The gland assembly 46 is attached to a tubular elongated ground plane electrode 16 that includes spaced perforations 18 at its upper and lower extremities, and at its center. A solid cylindrical reference probe 20 is located in spaced parallel relationship concentric to the lower portion of the ground plane electrode 16, as illustrated in FIGS. 2 and 3. A cylindrical annular measuring probe 22, having an outer diameter equal to the diameter of the reference probe 20, is arranged in spaced parallel concentric relationship to the upper portion of the ground plane electrode 16 and has a outer geometric configuration congruent relative to the reference probe 20, as is apparent from FIG. 3.

Figure 5:
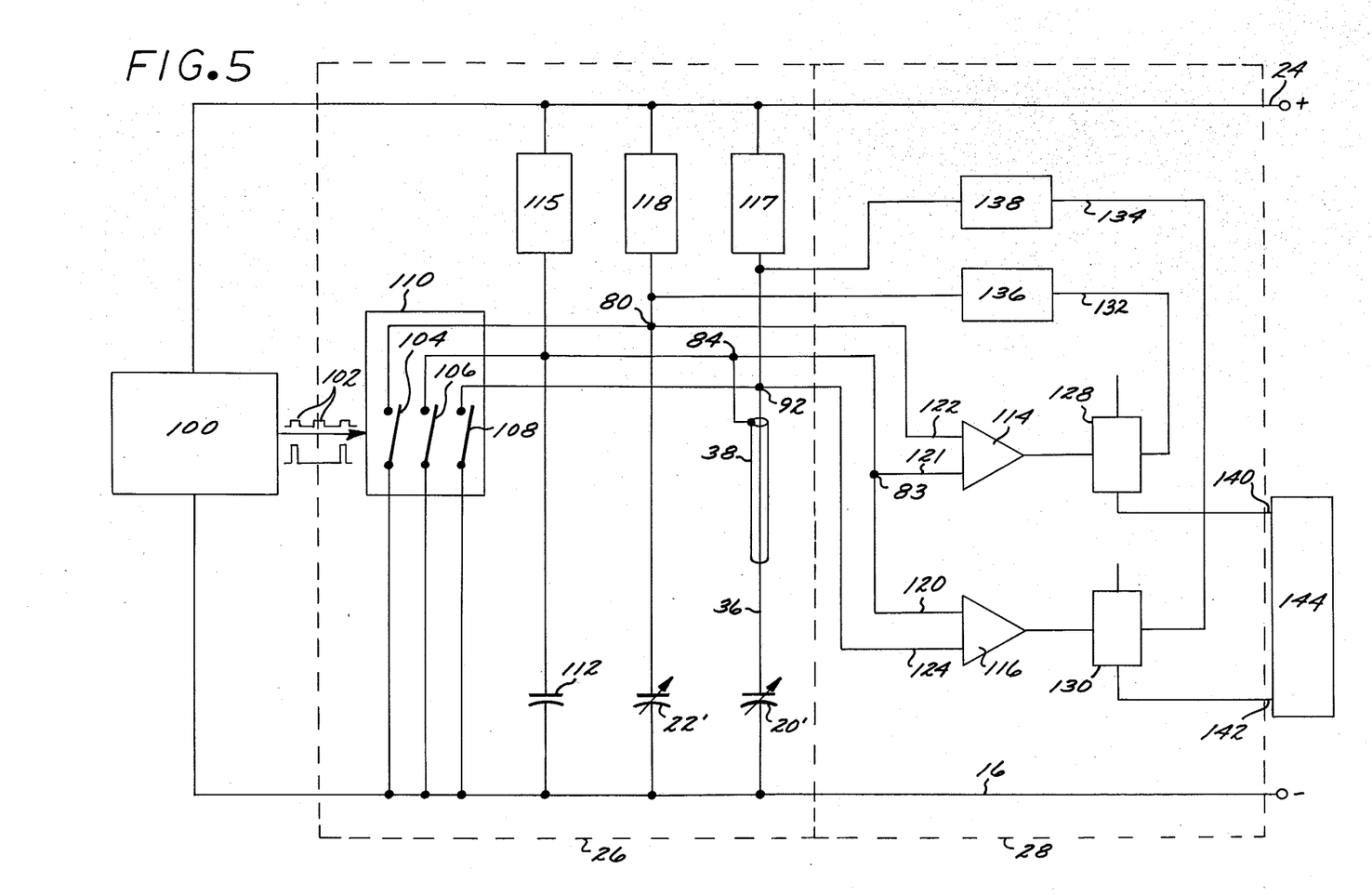
FIG. 5 is a schematic block diagram of the signal transmitter and the sensor.
Figure 6:
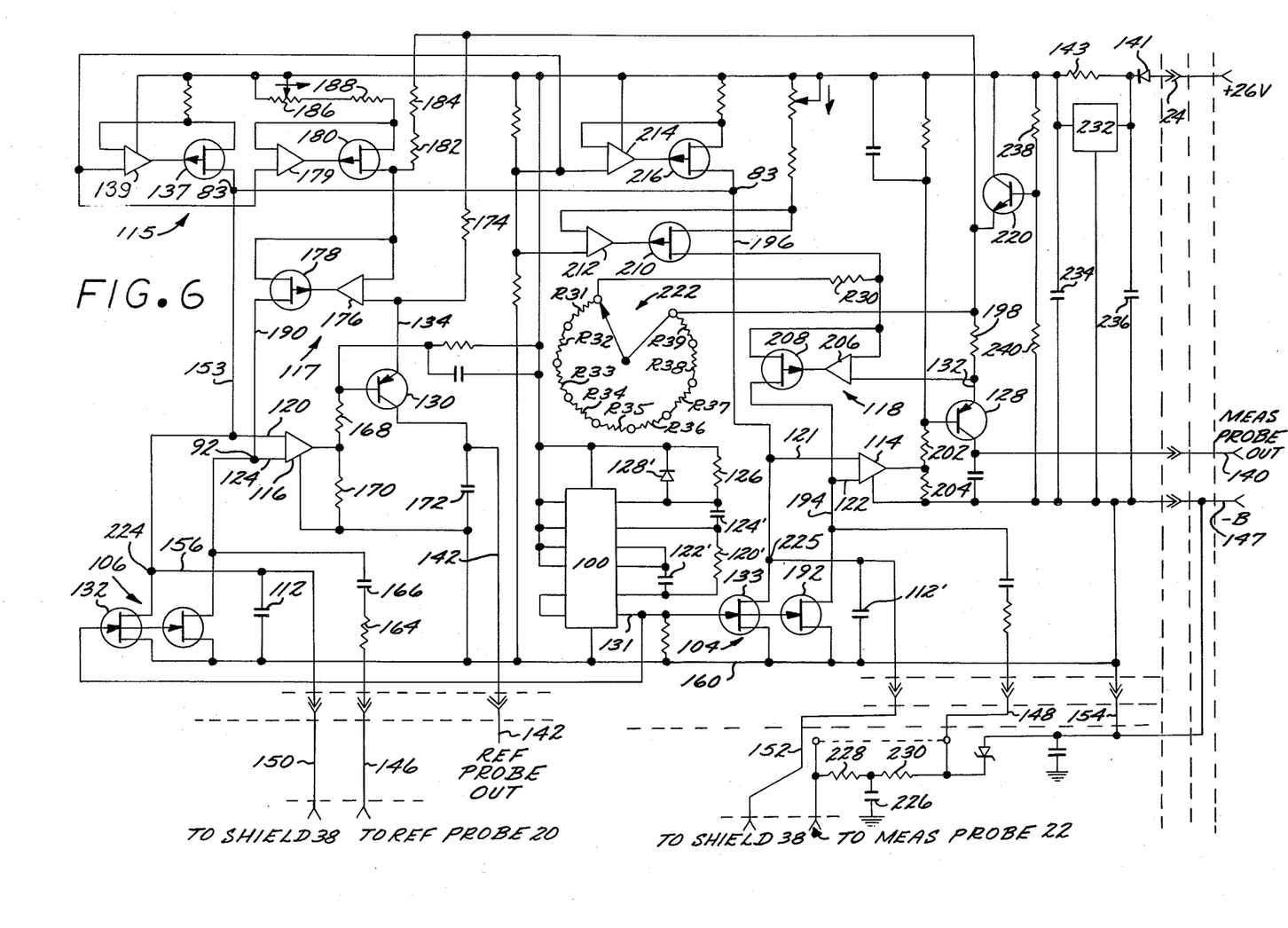
FIG. 6 is a circuit diagram of the signal transmitter.

An electrical charging source which includes a voltage input line 24, depicted in FIGS. 5 and 6, applies a common electrical current between the ground plane electrode 16 and the reference probe 20 and also between the ground plane electrode 16 and the measuring probe 22. The signal transmitter illustrated in FIG. 5 includes a multivibrator 26, and a charge rate discriminator 28. The charge rate discriminator 28 includes differential amplifying circuitry coupled to the reference probe 20 and the measuring probe 22 to detect a capacitance differential therebetween. The capacitance of the reference probe is depicted schematically at 20' in FIG. 5 and the capacitance of the measuring probe is depicted schematically at 22'.

The ground plane electrode 16 is illustrated in FIGS. 1–4. The ground plane electrode 16 may be constructed in any of several lengths, and preferably has a maximum length of no greater than 180 inches. The ground plane electrode 16 is preferably constructed of stainless steel and has an upper section 17 surrounding the measuring probe 22 and a lower section 19 surrounding the reference probe 20. The lower section 19 of the ground plane electrode 16 is closed by an annular teflon spacer 30 which is held in position by four center punches 32 spaced 90 degrees apart adjacent the lower extremity of the ground plane electrode 16, as illustrated in FIG. 3. The ground plane electrode 16 is perforated by apertures 18 located just above the teflon spacer 30. The apertures 18 have a diameter of approximately 0.250 inches.

Within the confines of the teflon spacer 30 there is an elongated cylindrical annular teflon outer insulating probe casing 34, closed at the bottom by a cylindrical plastic plug 34'. The probe casing 34 surrounds the reference probe 20 and the measuring probe 22. The reference probe 20 is a solid stainless steel rod-like structure, and is connected to the terminal 12 by means of a 20 gauge wire connector 36 as illustrated in FIG. 3. At the center of the upper end of the reference probe 20 a narrow well 33' is drilled. An annular retaining bushing 36' captures the lower extremity of the wire connector 36, and the lower end of both the wire 36 and the metal retaining bushing 36' are forced into the well 33'. About the bushing 36' the reference probe 20 forms a thin annular sleeve 37' that extends upward in contact with the bushing 36'. A collar 38' is located concentrically about the sleeve 37'. The lower extremity of the measuring probe 22 is drawn into a thin, tubular partition 39' that surrounds the collar 38'. The partition 39', the collar 38', the sleeve 37' and the bushing 36' are all tightly clasped together to hold the measuring probe 22 and reference probe 20 together. Immediately above the bushing 36' a ferrule 40' grips the wire 36. The ferrule 40' also grips the lower extremity of an insulating sleeve 37 that surrounds the wire 36 as well as an annular braided stainless steel jacket 38 positioned thereabout. The jacket 38 serves to decouple the reference electrode 20 from the measuring electrode 22. The ferrule 40' also grips a plastic insulating tube 39 that surrounds the jacket 38.

From the reference probe 20, the wire connector 36 extends axially upwardly through the hollow center defined in the annular circular measuring probe 22. The wire connector 36 is shielded by means of the braided stainless steel jacket 38 which is arranged concentrically within the longitudinal hollow center of the measuring probe 22. The concentric insulating sleeve 37 is interposed about the wire 36 and within the jacket 38, and the outer insulating sleeve 39 concentrically surrounds the jacket 38 within the measuring probe 22.

The outer surface of the ground plane electrode 16 is scribed about with a line at 21 about 7 and ¼ inches from the lower extremity of the reference probe 20, as depicted in FIGS. 1 and 2. An annular teflon spacer 40 is located a short distance above the scribe line 21 and is held in place by two center punches 42 on opposite sides of the ground plane electrode 16 spaced 180 degrees apart. The spacer 40 converges from contact with the inner wall of the ground plane electrode 16 to a narrow band of contact with the probe casing 34. A drain passage 41 is provided through the structure near the center of the annular spacer 40. Immediately above the teflon spacer 40 there are four apertures 18 spaced 90 degrees apart and extending through the structure of the ground plane electrode 16 as depicted in FIG. 2.

Near the upper extremity of the upper section 17 of the ground plane electrode 16 there is another teflon spacer 40, which likewise is held in position by two center punches 42 spaced 180 degrees apart. Apertures 18 are located immediately thereabove. The upper extremity of the ground plane electrode 16 is received within the annular gland assembly 46. The gland assembly 46 has a reduced diameter shank 14 having external pipe threads thereon for mounting in the horizontal deck 13 atop a fluid containing vessel. The gland assembly 46 has successive counterbores 50, 52 and 54.

An inverted cup-shaped compression plug 56, having an axial aperture therein, is formed with a slightly enlarged flanged base 58 that is received in the counterbore 54 of the gland assembly 46. The base 58 is longitudinally secured by an inwardly directed lip 60 of the gland assembly 46 which is rolled over a coacting shoulder at the base of the flange 58 of the compression plug 56. The compression plug 56 also has successive enlarged diameter counterbores 62, 64 and 66. The annular shoulder between the counterbores 62 and 64 provides an abutment which provides bearing restraint for a retaining ring 68 which fits about the external surface of the probe casing 34. The probe casing 34 is continuous from the bottom of the probe to above the gland assembly 46. The measurement probe 22 terminates above the upper extremity of the probe casing 34 in a hollow externally threaded stud 72 that projects upwardly. An annular packing seal 74 is compressed by the end of the retaining ring 68 in the annular space within the counterbore 62 in the compression plug 56.

Likewise, the seal 48 within the threaded shank 14 of the gland assembly 46 is compressed within the counterbore 50 by the annular sleeve 76 which is secured about the upper extremity of the teflon insulating casing 34.

The counterbores 64, 66 and 52 provide an internal chamber within the gland assembly 46 which receives a sleeve-like deflection arch 78. The deflection arch 78 provides improved service life for the gland assembly 46 by accomodating thermal cycling conditions, as described in U.S. patent application Ser. No. 92,085 filed on Nov. 7, 1979.

The probe terminal 12 is depicted in detail in FIG. 4. The stud 72 at the upper extremity of the measuring probe 22 is received in threaded engagement within an internally threaded stainless steel probe extension base 80. The base 80 forms the contact terminal to the measuring probe 22. The insulated and jacketed cable to the reference probe 20 extends axially through the probe extension base 80 in electrical isolation therefrom.

Within the probe extension base 80 there is an annular teflon bushing 82 having a radially outwardly extending flange which seats atop the upper extremity of the base 80. Concentrically within the bushing 82, and extending axially upwardly therefrom there is a center tube extension 84 having a widened diameter central portion and having longitudinally extending narrower annular portions 86 and 88 of reduced diameter. The center tube extension 84 is formed of brass and serves as the electric contact terminal for the braided stainless steel jacket 38 that surrounds the reference probe 20 and decouples the reference probe 20 from the measuring probe 22. The jacket 38 is electrically connected by a soldered connection 90 to the upwardly extending annular portion 88 of the center tube extension 84. The surrounding insulation 37 about the wire conductor 36 electrically isolates the reference probe 20 from the jacket 38. The end of the electrical conductor 36 is pulled through a narrow diameter hole in an annular cap-shaped probe extension end 92 and is soldered thereto at 94. The wire 36 establishes electrical continuity between the reference probe 20 and the probe extension end 92.

The probe extension end 92 serves as the electric contact terminal for the reference probe 20. The probe extension end 92 is separated from the center tube extension 84 by a bushing 96, which is identical to the bushing 82 but located in inverted disposition and in axial alignment therewith between the center tube extension 84 and the probe extension end 92.

Using a conventional connector jack for receiving a bayonnet terminal, separate contacts within the jack socket establish electrical connections to the reference probe 20 through the probe extension end 92, to the shield 38 through the center tube extension 84 and to the measuring probe 22 through the probe extension base 80.

The sensor circuitry and connection to a control unit are depicted in FIGS. 5 and 6. As illustrated, line 24 is connected to a 26 volt d.c. power supply which is directed to an oscillator 100, while a line 147 from the control unit 144 carries the B- voltage supply. The oscillator 100 emits a square pulsed output, depicted at 102 in FIG. 5. Preferably, the train of square wave voltage closes normally opened single pole switches 104, 106 and 108, indicated collectively at 110 in FIG. 5. The reference probe 20, the measuring probe 22 and the shielding jacket 38 are respectively connected to the ground plane electrode 16 through the switches 108, 104 and 106 respectively in the absence of pulses 102 from the oscillator 100.

A standard capacitor 112 is a conventional capacitor physically connected between the ground plane electrode 16 and the switch 106 as illustrated. The standard capacitor 112 is coupled to the electrical charging input line 24 through a fixed current generator 115. The application of a constant charging current to the standard capacitor 112 results in a sawtooth voltage potential across the capacitor 112 when the switch 106 is opened by the oscillator 100 during the square wave pulses 102. Likewise, the reference probe 20 and the measuring 22 are connected to fixed current generators 117 and 118 respectively, depicted in FIG. 5, which are controlled to produce the same sawtooth ramp as the constant current generator 115. Accordingly, the capacitance 20' of the reference 20 and the capacitance 22' of the measuring probe 22 will exhibit a sawtooth wave form, which will have the same slope as the standard capacitor 112.

The capacitance value 22' will vary both with changes in liquid height, and also with changes in the dielectric constant of the liquid under measurement, relative to the standard capacitor 112. The capacitance 20' will vary only with changes in the dielectric constant relative to the standard capacitor 112. The charge rate discriminator circuit 28 includes differential amplifying circuitry in the form of a pair of differential amplifiers 114 and 116. Leads 121 and 120 of differential amplifiers 114 and 116, respectively, are connected to the standard capacitor 112. The other input 122 of differential amplifier 114 is connected to the measuring probe 22 through the probe extension base 80 depicted in FIG. 4. The other input 124 of the differential amplifier 116 is connected to the reference probe 20 through the probe extension end 92, depicted in FIG. 4. The shielded jacket 38 surrounding the conductor 36 that is connected to the reference probe 20 is connected to the standard capacitor 112 through the center tube extension 84, depicted in FIG. 4.

The amplifiers 114 and 116 are connected, respectively, through current control circuits 128 and 130 in feedback loops 132 and 134, respectively. The feedback through loop 132 is adjustable using a current control adjustment 136, and the current feedback through loop 134 is adjustable by a current control adjustment 138. In this fashion, a selected feedback current can be induced which will cause the sawtooth wave forms to match that of capacitor 112. The outputs of amplifiers 114 and 116 are also directed on lines 140 and 142, respectively, to a microprocessor based control unit 144, depicted in FIGS. 5, 7 and 10.

The specific circuit implementation of the system indicated generally in FIG. 5 is depicted in detail in FIG. 6. A jack connection to a lead 146 connects the reference probe 20 to the probe extension end 92, depicted in FIG. 4. Similarly, a jack connection to a lead 148 couples the measuring probe 22 to the probe extension base 80. Jack connections to leads 150 and 152 are coupled to the shield 38 and a jack connection to lead 154 is coupled to the ground plane electrode 16.

The oscillator 100 is a CMOS quad NAND gate oscillator. The first three gates, resistor 120' and capacitor 122' form a simple logic oscillator. Capacitor 124' and resistor 126 differentiate the output wave form from the oscillator. Diode 128' limits the differential wave form to a single half wave so that the output on line 131 is a train of voltage pulses with a period the same as the oscillator 100 and a pulse width which is controlled by the values of resistor 126 and capacitor 124'. The cycle frequency of the oscillator is preferably from 100 to about 125 kilocycles per second, and the pulse width is much less than half the period, and preferably is from about 2 to about 10 percent of the cycle duration. It has been found that these ranges of frequency and pulse width are highly beneficial since they favorably reduce the tendency of the capacitance probe when coated to respond in an anomalous manner.

The train of voltage pulses produced by the oscillator 100 is applied through line 131 to switches 104 and 106, which respectively include VMOS switches 133 and 132. The constant current generator 115 includes an amplifier 139, a PMOS transistor 137 and a transistor. The amplifier 139 produces an output which gates the transistor 137 to produce a constant current flow on line 153 through line 156 to a standard capacitor 112. The voltage potential between a standard capacitor 112 and the line 160, which is connected to the ground plane electrode 16 through line 154, is applied on input line 120 to one input of the differential amplifier 116. The other input to amplifier 116 is on line 124 from the reference probe 20 through a resistor 164 and a capacitor 166. The output of differential amplifier 116 is indicative of the capacitive differential between the reference probe 20 and the ground plane electrode 16. This output is directed through a dividing network comprised of resistors 168 and 170 to the base of the transistor 130. The current flow through the transistor 130 is a direct current on output line 142 which is fed as an input to the microprocessor 144 through a jack connection to line 142 as illustrated in FIG. 6. Output line 142 is d.c. isolated from the ground plane electrode 16 by the capacitor 172.

The output of differential amplifier 116 includes a feedback loop through the emitter of the transistor 130. The emitter of transistor 130 is connected to a resistor 174, and also to one input of a differential amplifier 176. The output of differential amplifier 176 is connected to the base of a PMOS transistor switch 178. The opposite input to the amplifier 176 is from a junction that is connected both to a PMOS transistor switch 180 and also to resistors 182 and 184. Current is supplied to the PMOS transistor 180 through a variable trimming resistor 186 connected in series with another resistor 188. The amplifier 176 gates the PMOS transistor switch 178 so that the current supplied to the reference probe 20 on line 190 produces the same sawtooth wave form as that on the standard capacitor 112 on lines 153 and 156. As current flows through line 134, there is a certain voltage drop across resistor 174. This produces the current which is fed to the emitter of the transistor 130. This current is maintained constant at some particular level between 0 and 5 milliamps for a specific dielectric constant of the liquid being measured. If the dielectric constant should change, for any reason, the current level through resistor 174 will also change, as will the output, on line 134.

The charging current to the reference probe 20 through jack connection 146 on line 190 tracks the charging current to the standard capacitor 112 on line 153 by the operation of the gating PMOS transistors 178 and 180. That is, any variation between the charging currents on lines 153 and 190 would result in a change of voltage differential across the resistor 174. A corresponding change in voltage potential would act through the resistors 184 and 182 on the opposite input to the amplifier 176. Amplifier 176 would then adjust the charging current through PMOS transistor switch 178. The variable trimming resistor 186 is used to null out terminal capacitance at the connector terminal 12, so that terminal capacitance is not a factor in the operation of the circuit.

The charging circuit for the measuring probe 22 functions in a very similar fashion. That is, the fixed current source 115 provides a current flow through the VMOS transistor switch 133 when the oscillator 100 emits pulses 102. The potential of the standard capacitor 112' is provided on line 121 as one input to the differential amplifier 114. The other input to differential amplifier 114 is provided on line 122 through the jack connection to line 148 from the measuring probe 22. The VMOS switch 133 triggers the VOMS switch 192 so that the sawtooth wave form on line 194 is equal to that on line 196. Current through the resistor 198 is directed to the emitter of the transistor 128. The transistor 128 is gated through a dividing network formed by resistors 202 and 204 to provide the output of the measuring probe 22 through the jack connection to line 140 to the microprocessor 144. The constant current generator 118 is formed by the differential amplifier 212 and the PMOS transistor switch 210 which correspond, respectively, to the differential amplifier 179 and PMOS transistor switch 180. The PMOS transistor switch 206 and the differential amplifier 208 correspond, respectively, to the amplifier 176 and the PMOS transistor switch 178. A differential amplifier 214 and a PMOS transistor switch 216 operate to provide ½ of the charging current to the standard capacitor 112', and thereby share the current charging load with the amplifier 139 and transistor switch 137. By dividing the current load, a better switching action is obtained.

The transistor 220 performs a voltage dropping function from line 24 to provide an appropriate voltage to dial 222. Dial 222 is a manually operable selector to interpose an appropriate resistance in the resistor string R31-R39 into the circuit to correspond to the length of the ground plane electrode 16 and the measuring probe 22. The overall length of the ground plane electrode 16 may vary from one foot, with the selector switch 222 in the position depicted in FIG. 6, to a maximum of 15 feet.

It should be noted that lines 150 and 152 to the shield 38 are connected to the charging circuit for the standard capacitor 112 at the junction 224 and to a duplicate standard capacitor 112' at junction 225. The shield 38 is thereby driven by the voltage ramp of the standard capacitor 112 (and 112') to decouple the reference probe 20 from the measuring probe 22, as previously described.

The capacitor 226 and the resistors 228 and 230 may be provided as an optional feature to eliminate static charges that may build up on the probe. The use of the capacitor 226 and resistors 228 and 230 eliminates any damage to the inputs that might result from such static charges on the probe. The voltage regulator 232 and capacitors 234, and 236 and the resistors 238 and 240 serve to regulate the d.c. voltage supply to the system.

Figure 7:
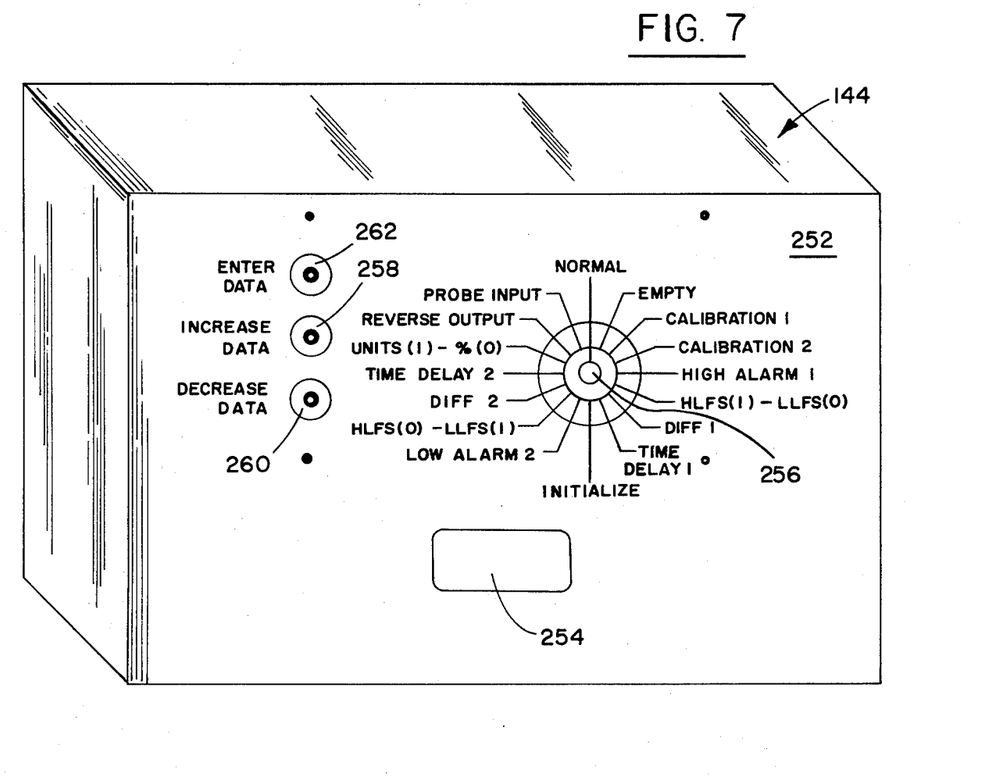
FIG. 7 is a perspective view of the control unit.
Figure 10:
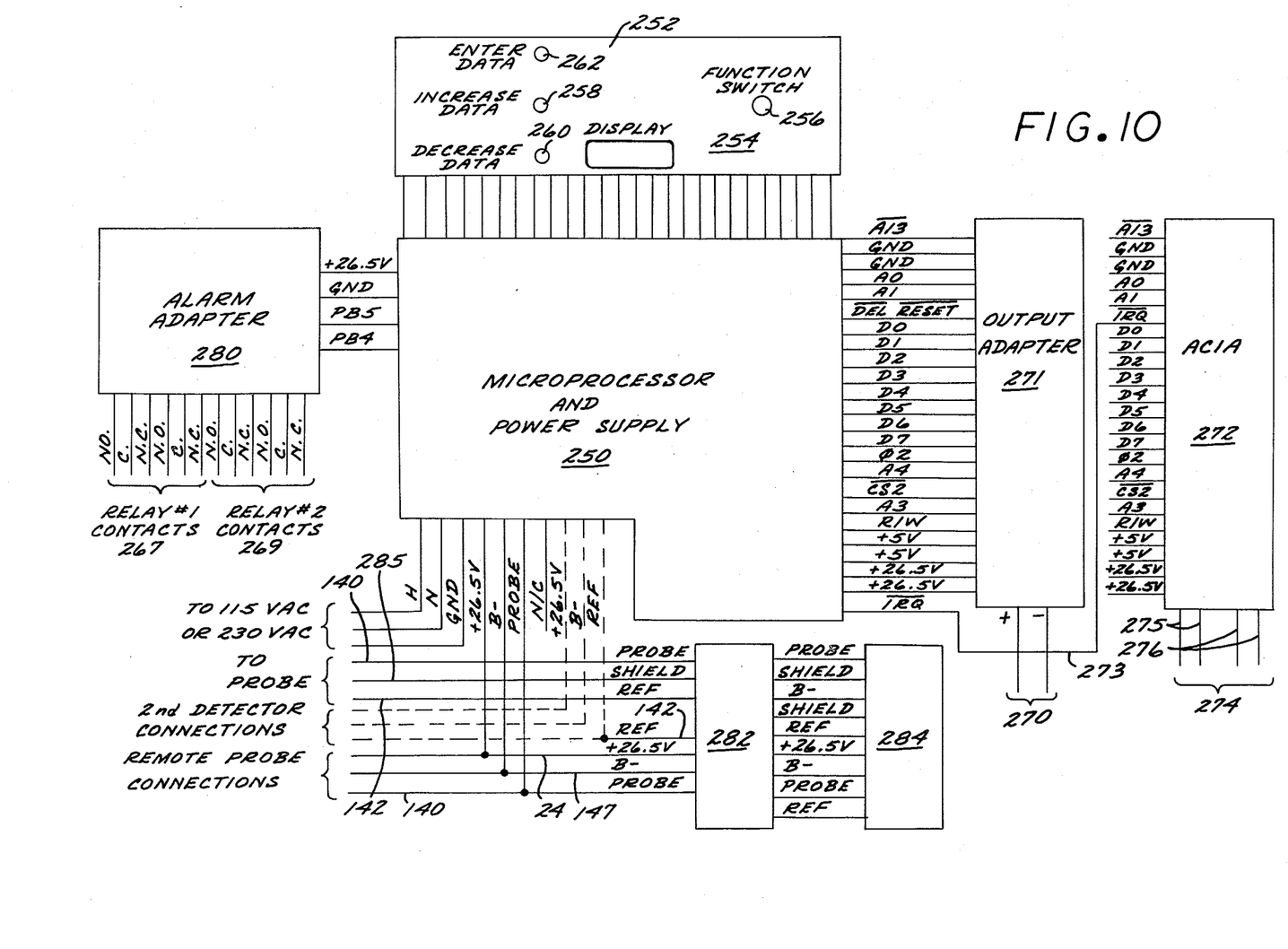
FIG. 10 is a diagram illustrating interconnection of the microprocessor to the output devices.

FIG. 7 illustrates the control unit 144 housing the microprocessor of the invention. The control unit 144 is housed in a case 252 shaped generally in the form of a rectangular box, having dimensions of approximately 11 inches by 14 inches by 6 inches. On the face of the case 252 there is an LED three position digital display 254 for displaying numerical indicia which are related to the depth of liquid in a container in which the sensor is mounted. Near the display 254 there is a rotary selector dial 256 having the functional indications depicted in FIG. 7 which are indicative of the mode of the operation of the microprocessor. Movement of the pointer of the rotary dial 256 alters the interconnection of electrical contacts beneath the face of the case 252 to selectively close switches interconnecting the bus lines and the input/output lines to the microprocessor 250, as depicted in FIG. 10. By manipulating the pointer of the rotary dial 256, an operator can perform certain calibrations and control the nature of the data appearing in the display 254.

The control unit 144 also includes two buttons useful in calibrating the unit. The INCREASE DATA button 258 causes a signal from the microprocessor 250 of the control unit 144 to be utilized as a substitute input in place of one or the other of the probe signals on lines 140 and 142, as will hereinafter be described. Continued depression of the button 258 will cause the signal to increase at a constant rate from a value initially appearing in the display 254. Conversely, depression of the DECREASE DATA button 260 will cause data initially in the display 254 to decrease at the same constant rate. Depression of the ENTER DATA button 262 will cause data appearing in the display 254 to be entered into RAM memory in the microprocessor 144 in a manner hereinafter to be described.

Figure 8:
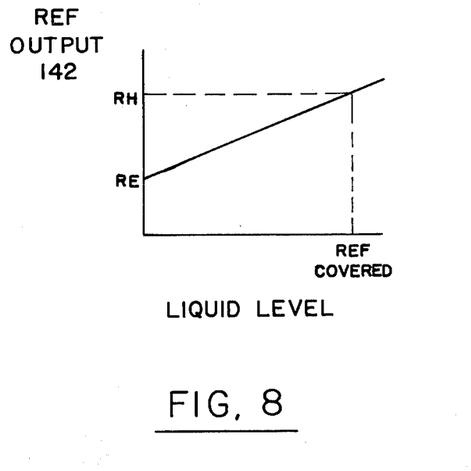
FIG. 8 illustrates graphically the relationship between liquid level and the reference probe reading.
Figure 9:
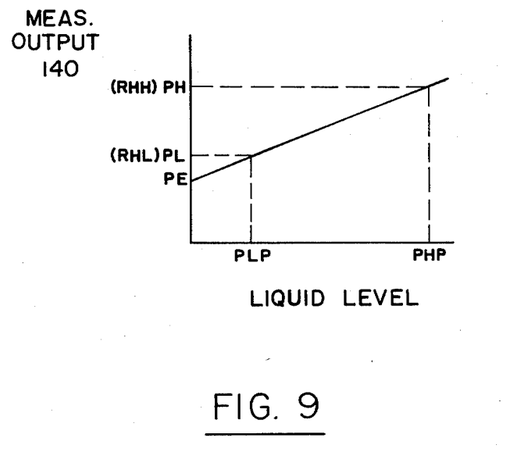
FIG. 9 illustrates graphically the relationship between liquid level and the measuring probe reading.

FIGS. 8 and 9 illustrate graphically certain linear relationships of the output of the reference probe on line 142 and the output of the measurement probe on line 140. These relationships are utilized by the microprocessor 250, depicted in FIG. 10, to internally compensate for changes in the dielectric constant of the liquid being measured.

FIG. 8 illustrates the relationship between the output on line 142 to the microprocessor 250 from the reference probe 20 as that output varies with liquid level. The lowest value of the output on line 142 is the value RE, which is the reading from the reference probe 20 when it is clean and dry in air when positioned concentrically within the ground plane electrode 16, as depicted in FIGS. 1-4. A higher value RH on the output line 142 is reached in linear fashion when the reference probe 20 is completely covered with the liquid being measured.

Similarly, in FIG. 9 the output on line 140 from the measuring probe 22 is the value PE when the measuring probe 22 is clean and dry in air within the ground plane electrode 16. The output on line 140 increases to a value PL (RHL) when the liquid level within the container is at some relatively low level PLP. This level must be above a level that completely covers the reference probe 20. The output level PL appearing on the measuring probe output line 140 may be assigned an arbitrary percentage value of a full scale reading. For example, some low level value, arbitrarily selected, of the output signal PL on line 140 at liquid level PLP may be assigned a ten percent position of full scale reading. Alternatively, it may be assigned a different percentage, such as five percent or twenty percent. Similarly, a relatively high level output PH on line 140, corresponding to a level of PHP may be assigned a higher percentage of full scale reading. Again, this percentage may be arbitrarily assigned, perhaps, 80, 90 or even 95 percent of a full scale reading.

With specific values assigned to the parameters of the reference probe 20 and measuring probe 22, the microprocess or 144 is able to perform certain computations to adjust the raw output obtained from the measuring probe 22 on line 140 to compensate for changes in the dielectric constant of the liquid being measured. Specifically, any change in the output from the reference probe 20 on line 142 is reflected in the corrected value of the output from the measuring probe 22 on line 140 according to the following equations (1) and (2).

$$K = \frac{RV - RE}{RH - RE} \text{ Where } RH = \frac{RHH - RHL}{PHP - PLP} \times \quad (1)$$

$$\text{output} + RHL - \frac{RHH - RHL}{PHP - PLP} PLP$$

$$\text{Corrected Output of Meas. Probe} = \frac{PV - (PL - PE) \times K + PE}{(PH - PL) \times K} \times \quad (2)$$

$$(PHP - PLP) + PLP$$

As can be seen from the foregoing equations, the relationship between changes in the dielectric constant, as reflected through changes in the value from the reference probe output on line 142, are not quite linear. Certain relatively small corrections are performed using the equations given.

When the pointer of the selector dial 256 is moved to the CALIBRATION 1 position in FIG. 7, the outputs on lines 140 and 142 are stored in RAM memory in the microprocessor 144, and used internally therein, as the basis for correcting the measuring probe output on line 142 for changes in dielectric constant.

To calibrate the control unit 144 in order to enter the reference points RE, RH, PE, PL (RHL), and PH (RHH) that are utilized by the microprocessor 250, depicted in FIG. 10, the operator empties a container in which the sensor 10 is to be located, or removes the sensor 10 entirely from the container and dries it out. The operator then moves the marker of the rotary selector dial 256 to the EMPTY position indicated at FIG. 7 and depresses the ENTER DATA button 262. At this time the magnitude of electrical current on lines 142 and 140 are entered as the reference values in air for RE (Reference Empty) and PE, (Probe Empty) respectively. That is, the magnitude of the electrical current appearing on line 142 becomes the value which the microprocessor 250 utilizes as the value of RE in equations 1 and 2. The electrical current level appearing on line 140 becomes the value which is utilized as the PE value in equations (1) and (2). The microprocessor 250 stores these values in RAM memory for use in solving the equations (1) and (2).

After entering the RE and PE values with the marker of the selector dial 256 directed to the EMPTY position, the operator next turns the selector dial 256 to the CALIBRATE 1 position. The operator places the sensor 10 in liquid to a depth corresponding to the particular depth to be treated as the lower position, PL (RHL) and having a corresponding signal value on line 140 from the measuring probe 22. The sensor 10 need not be in the actual process liquid container in which it is to be used. This depth typically would be some specified percentage, perhaps 10 or 20 percent of the overall span of measurement of the measuring probe 22. The operator then ramps the data appearing in the display 254 from the value initially transmitted on line 140 to the particular value which he desires to be used in conjunction with this lower reference level. The numbers which appear in the display 254 may be indicative either of a level within the container in units, such as feet or centimeters, or the numbers displayed may indicate a percentage. In either event the operator is able to alter the numbers appearing in the display to the desired number associated with the liquid level at that height using the INCREASE DATA button 258 and the DECREASE DATA button 260. When the appropriate number appears in the display 254, the operator presses the ENTER DATA button 262 and the signal appearing on line 140 is entered internally into the microprocessor 250 as the PL (RHL) reference value for use in solving the equations (1) and (2).

The operator next turns the pointer of the rotary dial 256 to the CALIBRATE 2 position. The level of liquid within the container in which the sensor 10 is located is increased to a level in the upper region near the upper limit of the span of levels to be measured. This level may, for example, by 80 percent, 85 percent or 90 percent of the entire measurement span. The numbers appearing in the display 254 are then adjusted using the INCREASE DATA button 258 and the DECREASE DATA button 260 so that the actual signals on lines 140 and 142 are internally corrolated within the microprocessor 250 to produce a visual output in the display 254 indicative of the number desired. This number may be a percentage or an actual level. The actual signals appearing on lines 142 and 140 are internally stored within the microprocessor 250 as the RH and PH (RHH) values. In this way the operator is able to enter reference values for all of the parameter locations required to solve equations (1) and (2) when the instrument is operated in the NORMAL mode. When the sensor 10 is located in the process liquid and the selector dial 256 is turned to operate in the NORMAL position, the system is available for use to measure the level of liquid in the container while automatically compensating for changes in the dielectric constant.

If one desires to recalibrate the instrument by changing the percentage level associated with the actual data readings stored from lines 140 and 142 it is possible to do this automatically without acquiring new data on lines 140 and 142. This is done by turning the marker of the selector dial 256 to the CALIBRATE 1 or CALIBRATE 2 position and using the INCREASE DATA button 258 and the DECREASE DATA button 260 to change the number which appears in the display 254. The ENTER DATA button 262 is not depressed, however. Rather, the last value appearing in the display after manipulation of the INCREASE DATA button 258 and decrease data button 260 is treated as the percent or the units associated with the particular data readings from lines 140 and 142 previously stored as the values PL (RHL) or PH (RHH). In this way a particular reading from the probes may be changed from an indication of 15 percent of the measuring span to 20 percent, for example, when the INCREASE DATA button 258 and the DECREASE DATA button 260 are manipulated with the selector dial 256 of the control unit 250 in the CALIBRATE 1 position. Similar, a percentage change associated with the actual data stored from lines 140 and 142 may be performed by manipulating the INCREASE DATA button 258 and DECREASE DATA button 260 with the dial 256 in the CALIBRATE 2 position.

With reference to FIG. 7, the HIGH ALARM 1 position allows entry of data to indicate the percentage of full scale at which the alarm outputs of the control unit 144 will be activated. The HIGH ALARM 1 position is set using the INCREASE DATA button 258 and the DECREASE DATA button 260, followed by depression of the ENTER DATA button 262 when the appropriate percentage level appears in the display 254 while the selector dial 256 is in the HIGH ALARM 1 position.

The next position of the rotary dial 256 is the high level fail safe or a low level fail safe position (HLFS(1)-LLFS(0). In this position a one in the display 254 indicates that the output relay contacts 267 for the alarm outputs of relay number 1, depicted in FIG. 10, will be normally energized, while a zero in the display 254 indicates that the output contacts 267 for the first relay will normally be de-energized. Again, the INCREASE DATA button 258 the DECREASE DATA button 260, and the ENTER DATA button 262 are used to establish the desired convention so that the microprocessor 250 is able to correctly operate the relay according to the convention selected.

The next position of the rotary dial 256 is a differential position (DIFF 1). In this position the control unit 144 can be calibrated to establish the increment of change which the liquid level must undergo in order to revert from an alarm condition to a normal operating condition. That is, the number established using the INCREASE DATA button 250 and the DECREASE DATA button 260 in association with the ENTER DATA button 262 is indicative of the percent or number of units which the liquid level must fall in order to turn off the alarm output signals at contacts 267 once the high level alarm has been reached.

The next position of the rotary dial 256 is a TIME DELAY 1 position. In this position the microprocessor 250 can be programmed to establish the time interval after a high or low level alarm condition is reached at which the first relay alarm output contacts 267 will be activated.

The next position of the rotary dial 256 is the INITIALIZE position. This position is normally used only during initial calibration or following servicing to enter certain values into the microprocessor 250. For example, the HIGH ALARM 1 position is established at 800 percent, the differential and time delay are both established at zero, and other preprogrammed initialized selections are entered into the microprocessor 250.

The next position of the selector dial 256 is the LOW ALARM 2 position. From this position and proceeding clockwise in FIG. 7, the rotary dial 256 may be used to establish low level alarm set points, corresponding to some of the high level parameters previously described. Specifically, there is a high and low level fail safe position (HLFS(0)-LLFS(1) and a differential position (DIFF 2) both associated with the low alarm level. Selections for entries in these positions are performed using the INCREASE DATA button 258, and DECREASE DATA button 260 and the ENTER DATA button 262 as previously described. The entries into the microprocessor 250 with the selector dial at these positions govern the state of the second relay output contacts 269 in FIG. 10.

The next clockwise position of the rotary dial 256 is the units and percent position (UNITS(1)-(0)). In this position an entry of all zeroes in the display 254 will cause the microprocessor 250 to treat all other numerical entries from the other dial positions as percentages. Conversely, an entry of any other number while the rotary selector 256 is in the units and percent position will cause the microprocessor to treat entries in all other positions as unitary values, and to treat the number entered while the selector is in the unit and percent position as the full scale maximum reading. That is, if the number 220 is entered while the rotary selector 256 is in the units and percent position, the full span of the sensor 10 will be treated as 220 units.

The next position of the rotary dial 256 is the REVERSE OUTPUT position. This position is used to select an option to provide a reverse output. That is, in normal operation a reading of zero in the display would indicate that the container in which the sensor 10 is located is empty. By selecting the reverse output option, a zero reading would mean that the container is full and an increased reading therefrom would indicate an increased departure from the full level. That is, a maximum reading would occur when the container was empty. If a one is entered into the control unit 250 while the rotary dial 256 is in the reverse output position, the numbers displayed in the display 254 will be the reverse of the normal output. The numbers displayed during a normal output increase with increasing liquid level.

The next position of the rotary dial 256 is the PROBE INPUT signal. When the selector dial is in this position the actual reading of between 0 and 5 milliamps from the measuring probe 22 on line 140 appears in the display 254, as a percent of 5 milliamps. This position is used primarily for trouble shooting purposes.

The functional organization of the control unit 144 is depicted in FIG. 10. FIG. 10 illustrates the microprocessor 250 which has a built in power supply. The microprocessor 250 is connected to the manual controls of the control unit 144, described in conjunction with FIG. 7, by means of 26 bus connections. The CB1 line is a connection to the microprocessor 250 from the ENTER DATA button 262 which, when actuated by depression of the ENTER DATA button, strobes in the data reflected in the display 254. Lines PA0-PA3 are the signal lines to the microprocessor 250 which carry the value appearing in the display 254 for registration in the microprocessor 250 upon actuation of strobe line CA1 by the microprocessor 250. Lines PA4-PA7 are multiplexed lines from the microprocessor 250 which are used to activate the segments and the decimal point in the three digit display 254. The line CB2 is used to alternatively allow the display 254 to run, or to hold the display 254 for the input of a signal thereto. The signal is an analog to digital converted signal of the input from the measuring probe 22. Lines PB0-PB3 carry the digitally coded inputs of the sixteen positions of the rotary dial 256 to the microprocessor to control the operation of the microprocessor program subroutine. Line PB4 is used to set the limit of relay number 1 in the alarm adapter 280, and line PB5 is used to set the limit of relay number 2 therein. Line PB6, when actuated indicates depression of the DECREASE DATA button 260, while line PB7 indicates depression of the INCREASE DATA pushbutton 258.

The microprocessor 250 is also connected to an output adapter 271. The output adapter 271 serves as an interface with the microprocessor 250 and provides a pair of connection leads 270 which may be programmed by the microprocessor to carry an output current of from one to five miliamps or from four to twenty miliamps. The output adapter 271 has a digital to analog converter and receives a digitized output signal on lines D0 through D7 from the microprocessor 250 corresponding to the corrected output of the measurement probe 22 as calculated according to equations (1) and (2)

by the microprocessor 250. The output adapter may be reset by a signal on $\overline{\text{DEL RESET}}$. The data on lines D0 through D7 is triggered into the output adapter 271 by a command word which appears on lines $\overline{\text{A13}}$, A0, A1, A3 and A4. When the control signals on lines $\overline{\text{CS2}}$, R/W, $\phi 2$ appear in the proper sequence, the data on the data bus lines D0 through D7 is transferred into data storage in the output adapter 271 and transformed to analog output current on lines 270. The output adapter 271 has voltage supply and ground connections to the microprocessor 250 as indicated.

The unit may be provided with an automatic communication interface adapter 272. The automatic communication interface adapter serves as a means of communication with a users microcomputer. The connections of the automatic communications interface adapter 272 to the microprocessor 250 are substantially the same as to the output adapter 271 with the exception that the microprocessor is coupled to the automatic communication interface adapter 272 by an interrupt request line 273. Through a program in the microprocessor 250, signals from the users microprocessor on lines 274 are allowed access to the microprocessor 250. The command word on $\overline{\text{A13}}$, A1, A0, A3 and A4 to the automatic communication interface adapter 272 is different than the command word to the output adapter 271. The users microprocessor system may interrogate the microprocessor 250 by signals on lines 275, and may respond by signals on lines 276 through the automatic communication interface adapter 272. The adapter 272, simply stated, is an input/output adapter to allow communication between the microprocessor 250 and another microprocessor. The output adapter, on the other hand, produces an output on lines 270 which is merely proportional to the percentage display that appears in the display 254. This is typically connected to a meter or to some other analog instrument.

The alarm adapter 280 is connected to the microprocessor 250 by voltage and ground connections as indicated and by the PB4 and PB5 connections which are used, respectively, to set the normal condition of the output contacts 267 from the first relay and the output contacts 269 from the second relay in the system. The control lines PB4 and PB5 complete circuits to either the normally open or the normally closed contacts within the sets of relay contacts 267 and 269 as controlled by the microprocessor 250 as determined by the settings of the dial selector 256 in the HLFS(1)-LFS(0) and HLFS(0)-LLFS(1) positions, previously described.

A pair of transmitter sensor boards 282 and 284 are also coupled to the microprocessor 250 and to the sensor 10. The connecting lines 140, 142, and the shield connection 285 from the shield 38 (FIG. 4) are connected to both the sensor boards 282 and 284 as indicated. The sensor boards 282 and 284 contain the multivibrator circuit 26 and the charge rate discriminator 28, depicted generally in FIG. 5. The connections to the reference probe 20, reference probe 22 and shield 38 correspond to the connections depicted in FIGS. 5 and 6.

Using the sensor 10 and the control unit 250 constructed as described, variations in dielectric constant and even changes in the liquid material will not effect the accuracy of calibration. With the pushbutton calibration technique it is not necessary to repeatedly fill and empty or even completely fill the process as is required in older capacitance actuated level detector instruments in order to effectuate calibration. The embodiment of the invention depicted provides a microprocessor based capacitance level detector which allows a simplified calibration procedure or factory calibration, by utilizing the microprocessor memory and the programmed calibration equations (1) and (2).

With the embodiment of the invention depicted there are multiple alarm trip levels which are digitally calibrated within the microprocessor. The output lines 270 from the control unit 250 provide data bus communication with a higher level digital system or with a more sophisticated digital computer for monitoring level or alarm conditions.

It is to be understood that numerous variations and modifications of the level measuring device of the invention are possible. Accordingly, the scope of the invention should not be construed as limited to the specific embodiment depicted, but rather is defined in the claims appended hereto.

We claim:

1. A dielectric constant compensated level measuring device comprising:
   an elongated ground plane electrode of uniform cross section throughout and having first and second portions;
   a reference probe located in spaced parallel relationship to said second portion of said ground plane electrode,
   a level measuring probe arranged in spaced parallel relationship to said first portion of said electrode,
   a plurality of switches for coupling said level measuring probe and said reference probe to said ground plane electrode; and
   an oscillator for opening and closing said switches.

2. A level measuring device according to claim 1 further characterized in that said ground plane electrode is an annular cylindrical tube, said reference probe is a metal rod of cylindrical configuration located concentrically within said lower portion of said ground plane electrode, said level measuring probe is an annular cylindrical tube of outer diameter equal to the diameter of said reference probe, and said reference probe is coupled to said differential amplifying circuitry by a conductor that passes axially through said annular level measuring probe through an opening therein.

3. A level measuring device according to claim 2 further comprising an annular shielded jacket located concentrically within said level measuring probe and about said conductor.

4. A level measuring device according to claim 3 further characterized in that said shielded jacket is connected to said ground plane electrode through a switch which is opened and closed by said oscillator.

5. A level measuring device according to claim 4, further characterized by an electrical charging source for applying an electrical current between said ground plane electrode and said reference probe and between said ground plane electrode and said level measuring probe.

6. A level measuring device according to claim 5 further comprising a standard capacitor coupled to said charging source and to said ground plane electrode through another switch operated by said oscillator, and said electrical charging source is coupled to said standard capacitor, said reference probe and to said level measuring probe through fixed current generators, and said standard capacitor is connected to said shielded jacket.

7. A level measuring device according to claim 6 further characterized by a pair of differential amplifiers each having a first input connected to said standard capacitor, one of said amplifiers having a second input connected to said reference probe and the other of said amplifiers having a second input connected to said level measuring probe, and outputs of said amplifiers are both connected in feedback loops to the respective second inputs thereof, each through a fixed current generator associated therewith.

8. A level measuring device according to claim 6 further characterized in that said fixed current generators are adjustable to supply a selected current flow.

9. A level measuring device comprising:
a level sensing unit including a ground plane electrode, a reference probe and a level measuring probe;
circuit means for sensing the capacitance between said reference probe and said ground plane electrode and between said level measuring probe and said ground plane electrode and for providing outputs indicative of said capacitances;
a control unit coupled to receive said outputs from said circuit means, said control unit including memory storage with level limits stored therein;
comparison means for comparing said outputs of said circuit means with said stored level limits; and
alarm outputs actuated by said comparison means when said outputs of said circuit means reach said stored level limits.

10. A level measuring device according to claim 9, wherein said circuit means includes differential amplifying circuitry coupled to said reference probe and said level measuring probe.

11. A level measuring device according to claim 9 further characterized in that said control unit employs a microprocessor to receive said outputs from said differential amplifying circuitry, and said microprocessor includes means for performing arithmetic calculations upon reference outputs from said differential amplifying circuitry corresponding to known liquid levels to adjust said outputs of said differential amplifying circuitry to compensate for changes in dielectric constant of the liquid measured and to transform said outputs of said differential amplifying circuitry to liquid level indicating signals, and said control unit further comprises a display for imaging digital representations indicative of said liquid level indicating signals.

12. A level measuring device according to claim 11 further characterized in that said control unit comprises signal generating means for generating level indicating signals indicative of known relative liquid levels, and manually adjustable selector means for entering said level indicating signals associated with said known relative liquid levels into said microprocessor in association with actual outputs from said differential amplfiying circuitry stored in said microprocessor.

13. A level measuring device according to claim 12 further characterized in that said manually adjustable selector means includes means for manually associating said stored level limits with specific values of outputs from said differential amplifying circuitry.

14. A level measuring device according to claim 13 further comprising at least one relay connected to said alarm outputs, and said manually adjustable selector includes means for establishing a convention of normal and abnormal conditions of said relay outputs, and for signaling the selected convention to said microprocessor.

15. A level measuring device according to claim 13 further characterized in that said manually actuable selector includes means for establishing a differential and for signaling said differential to said microprocessor, whereby said microprocessor will deactivate said alarm outputs only when said outputs from said differential amplifying circuitry retreat from said stored level limits by an amount corresponding to said differential.

16. A level measuring device according to claim 13 further comprising time delay circuitry interposed between said microprocessor and said alarm outputs, and said manually adjustable selector includes means for adjusting said time delay circuitry to alter a period that elapses between the time that said differential amplifying circuitry reaches a stored level limit and the time of actuation of an associated alarm output.

17. A level measuring device according to claim 16 further characterized in that said microprocessor includes a stored initial differential and an initial time delay, and said manually adjustable selector includes means for erasing a manually selected differential and a manually selected time delay and replacing said manually selected differential and said manually selected time delay with said stored differential and said stored time delay.

18. A level measuring device according to claim 13 further characterized in that said manually adjustable selector includes means in said microprocessor for creating an image in said display of a complement of said level indicating signals over a full measuring span, whereby said display may be manually controlled to alternatively display level indicating signals proportional to said outputs from said differential amplifying circuitry and alternatively to display level indicating signals inversely proportional to said outputs from said differential amplifying circuitry.

19. A level measuring device according to claim 13 further characterized in that said manually adjustable selector includes means for gating said microprocessor to convert an output from said differential amplifying circuitry directly to a digital number indicative of current level thereof, and to display said current level as a level indicating signal in said display.

* * * * *

UNITED STATES PATENT AND TRADEMARK OFFICE
CERTIFICATE OF CORRECTION

PATENT NO. : 4,383,444
DATED : May 17, 1983
INVENTOR(S) : Norman V. Beaman and Gary B. Sellers It is certified that error appears in the above-identified patent and that said Letters Patent is hereby corrected as shown below:

Column 8, line 15: Change the second "transistor." to --resistor.--

Column 11, line 1: Change "process or" to --processor--

Column 12, line 17: Change "by" to --be--

Column 13, line 26: Change "250" to --258--

Column 13, line 42: Change "800" to --80.0--

IN THE CLAIMS:

Claim 11:

Column 17, line 37: Change [claim 9] to claim 10

Signed and Sealed this

Thirtieth Day of August 1983

[SEAL]

Attest:

Attesting Officer

GERALD J. MOSSINGHOFF
Commissioner of Patents and Trademarks